(12) United States Patent
Smaglinski et al.

(10) Patent No.: US 8,977,080 B2
(45) Date of Patent: Mar. 10, 2015

(54) COMPACT MULTIPLEXER/DEMULTIPLEXER

(75) Inventors: Ingo Smaglinski, Mainz (DE); Thomas Petigk, Rüsselsheim (DE); Martin Popp, Mainz (DE); Samuel Brantzen, Mainz (DE); Thomas Paatzsch, Mainz (DE)

(73) Assignee: Cube Optics AG, Mainz (DE)

( * ) Notice: Subject to any disclaimer, the term of this patent is extended or adjusted under 35 U.S.C. 154(b) by 346 days.

(21) Appl. No.: 13/123,258

(22) PCT Filed: Oct. 2, 2009

(86) PCT No.: PCT/EP2009/062853
§ 371 (c)(1),
(2), (4) Date: Jun. 2, 2011

(87) PCT Pub. No.: WO2010/040698
PCT Pub. Date: Apr. 15, 2010

(65) Prior Publication Data
US 2011/0222859 A1  Sep. 15, 2011

(30) Foreign Application Priority Data

Oct. 9, 2008 (DE) .................. 10 2008 042 719

(51) Int. Cl.
*G02B 6/26* (2006.01)
*G02B 6/42* (2006.01)
*H04J 14/02* (2006.01)
*G02B 6/293* (2006.01)

(52) U.S. Cl.
CPC .......... *G02B 6/4215* (2013.01); *G02B 6/29365* (2013.01); *G02B 6/4214* (2013.01); *G02B 6/4225* (2013.01)
USPC .............................................. 385/18; 398/79

(58) Field of Classification Search
USPC ......................................... 385/17, 18; 398/79
See application file for complete search history.

(56) References Cited

U.S. PATENT DOCUMENTS

| | | | |
|---|---|---|---|
| 5,029,968 A | 7/1991 | Geiser, Jr. et al. | |
| 5,633,531 A | 5/1997 | Hornig et al. | |
| 5,894,535 A * | 4/1999 | Lemoff et al. | 385/47 |
| 6,560,000 B2 * | 5/2003 | Iyer et al. | 359/238 |
| 6,870,976 B2 | 3/2005 | Chen et al. | |
| 2003/0152113 A1 | 8/2003 | Kropp | |
| 2004/0101247 A1 * | 5/2004 | Chen et al. | 385/47 |
| 2004/0202477 A1 | 10/2004 | Nagasaka et al. | |
| 2005/0041938 A1 * | 2/2005 | Hattori et al. | |
| 2005/0220416 A1 | 10/2005 | Baldwin et al. | |
| 2006/0002664 A1 | 1/2006 | Benzoni et al. | |
| 2008/0251683 A1 | 10/2008 | Paatzsch et al. | |

FOREIGN PATENT DOCUMENTS

| | | |
|---|---|---|
| DE | 4219953 A1 | 1/1991 |
| DE | 10043985 A1 | 3/2002 |

(Continued)

*Primary Examiner* — Jerry Blevins
(74) *Attorney, Agent, or Firm* — Paul & Paul

(57) ABSTRACT

The present invention relates to a multiplexer/demultiplexer with a connection for inputting and/or outputting an optical signal which has signal components of different wavelengths, a carrier plate (8) with at least one wavelength-sensitive element (11), a focussing member (13) with at least two focussing elements (14, 14') as well as a detector or signal-generator plate (1), on which at least two detectors (4) or signal generators are arranged. To achieve this object, it is proposed according to the invention that both carrier plate (8) and focussing member (13) are connected to the detector or signal-generator plate (1).

9 Claims, 9 Drawing Sheets

(56) References Cited

FOREIGN PATENT DOCUMENTS

| DE | 102005040731 | A1 | | 5/2006 |
| DE | 102005010557 | A1 | | 9/2006 |
| DE | 102005049731 | A1 | | 4/2007 |
| EP | 1004907 | A2 | | 5/2000 |
| EP | 1447695 | A2 | * | 8/2004 |
| WO | 0216987 | A1 | | 5/2002 |

* cited by examiner great expense in terms of production engineering and must be adjusted in a complex manner. Therefore it has already been proposed in DE 10 2005 010 557 to arrange a shaped part having several focussing elements as well as a carrier plate having several wavelength-sensitive elements on a mounting plate. The cost of adjusting the focussing elements relative to the carrier plate has thereby been simplified. However, in the embodiment described in DE 10 2005 010 557 the adjustment of the detectors is very complex.

COMPACT MULTIPLEXER/DEMULTIPLEXER

BACKGROUND OF THE INVENTION

The present invention relates to a compact multiplexer/demultiplexer.

The so named multiplex method is a method for the common transmission of several independent signals (primary signals) via a single transmission medium. In a multiplexer, the different primary signals are combined to form a single multiplexed signal and transmitted. They are separated again in a demultiplexer on the receiver side. With the so named frequency multiplex method each signal occupies a frequency band of specific breadth. The basebands of several primary signals are thus shifted into higher frequency positions by modulation with graduated carrier frequencies, such that they end up alongside one another on the frequency scale. A frequency multiplexed signal thus forms which is then optionally amplified and transmitted. On the receiver side, the individual signals are as a rule separated from one another again with the help of frequency filters and restored to the original frequency position by demodulation.

To transmit signals on optical waveguides, the so named wavelength multiplex method is generally used which represents an optical frequency multiplex method. Light signals of different frequency are used for transmission in the multiplex method. In this case, each frequency used provides its own transmission channel on which the actual data to be transmitted can be modulated (amplitude modulation). The data signals modulated in this way are then brought together by means of corresponding optical coupling elements and transmitted simultaneously, but independently of one another. At the receiver of this optical multiplex connection the individual optical transmission channels are then reseparated in a demultiplexer with the help of corresponding wavelength-selective elements, e.g. passive optical filters, and converted into electrical signals with corresponding detector elements.

Optical multiplexers and demultiplexers have been known for a long time. Basically a multiplexer can also be used as demultiplexer by reversing the beam path and vice versa. In this case, instead of detectors which convert the received transmitted optical signals into electrical signals, lasers which produce the corresponding light signals to be transmitted need merely be used.

In the following, the description refers explicitly to demultiplexers. However, it is understood that the described features can also be used advantageously in multiplexers, wherein the beam direction simply reverses.

Demultiplexers generally have an input connection for inputting an optical signal which has signal components of different wavelengths, at least one wavelength-sensitive element as well as at least two focussing elements, wherein the wavelength-sensitive element and the focussing elements are arranged such that at least one part of an optical signal input via the input connection first strikes the wavelength-sensitive element and then a focussing element, and a further part first strikes the wavelength-sensitive element and then a different focussing element. By wavelength-selective element is meant any element which, when placed in the beam path, influences one, several or indeed all wavelength channels. By influencing is meant for example reflecting, absorbing, amplifying, attenuating, interrupting or polarizing.

By focussing element is meant any element which can bring incident parallel light beams together substantially at one point, the so named focal point or focus. For example, optical lenses or concave mirrors can be used as focussing elements.

In the simplest case the demultiplexer has only one wavelength-sensitive element and two focussing elements. An input signal which consists of two separate frequency components (frequency channels) is then directed onto the wavelength-sensitive element which reflects one frequency component and allows transmission of the other. The focussing elements are arranged such that one receives the transmitted beam and the other the reflected beam, and directs them to the respective focal point. If a suitable radiation detector, e.g. a photodiode, is arranged at the corresponding focal points, the amplitude, i.e. the radiation intensity of the frequency signal, can be recorded electrically. Generally, however, a demultiplexer has a plurality of wavelength-sensitive elements onto which the signal is successively directed along the beam path, wherein each wavelength-sensitive element separates a wavelength channel from the rest of the signal. The arrangement of several wavelength-sensitive elements is also called the filter cascade.

The production of demultiplexers is however generally very costly. This is due i.a. to the required adjustment. The combined signal from a corresponding transmission medium, e.g. a glass fibre, must be directed onto corresponding detector elements with the help of a precisely adjusted arrangement of filters and mirrors in order to bring about an effective splitting of the signal into its individual channel components. Known demultiplexers also have comparatively large dimensions.

An optical wavelength demultiplexer comprising an optically transparent structure is already known from EP 1 004 907. The signal emerging from a glass fibre is guided inside the transparent material. The transparent structure is designed in two parts, wherein corresponding optical filters are arranged between the two parts. Although this demultiplexer is already compact, it can be produced only at

SUMMARY OF THE INVENTION

Therefore, against the background of the described state of the art, the object of the present invention is to provide a demultiplexer or multiplexer with a connection for inputting and/or outputting an optical signal which has signal components of different wavelengths, a carrier plate with at least one wavelength-sensitive element, a focussing member with at least two focussing elements as well as a detector or signal-generator plate on which at least two detectors or signal generators are arranged, which is easier to adjust and also displays a more compact structure compared with the state of the art.

According to the invention this is achieved in that the focussing member has at least one fibre stop, preferably formed integrally with the focussing member, for adjusting a waveguide and is connected to the detector or signal-generator plate via an elastic connecting element.

As a result of this measure, the previously conventional adjustment sequence can be modified and thus simplified. In the first step, the fibre is attached to the fibre stop and fixed. The fibre is thereby adjusted relative to the focussing member.

Next, the carrier plate is placed on the detector or signal-generator plate and aligned relative to the same. At this point it may be pointed out that the two named steps can also be carried out in the reverse sequence.

Only then is the focussing member aligned actively relative to the carrier plate and the detector and signal-generator plate. A light signal can be input via the glass fibre with the result that the beam path can be tracked. It can be determined via the detectors whether the signal is directed correctly onto the detector surface. Once this is the case, the focussing member is connected, via an elastic connecting element, to the carrier plate or preferably to the detector or signal-generator plate.

Although—as already stated—the present invention can be used in the same way for multiplexers and demultiplexers, the invention is described below only with reference to a demultiplexer. However, it is understood that in principle a multiplexer could also be designed accordingly, wherein only the signal direction need be reversed and the detectors replaced by signal generators, such as e.g. LEDs or VCSEL lasers.

In contrast to the embodiment described in DE 10 2005 010 557, focussing member and carrier plate are not mounted on a transparent mounting plate, but directly on the detector plate. The adjustment cost can thereby be greatly reduced. In addition, the structure of the demultiplexer is much more compact. There is particularly preferably no direct connection between focussing member and carrier plate. Instead, both are connected to the detector plate.

In a preferred embodiment, the detectors of the detector plate are arranged on the side of the detector plate facing the focussing member, wherein a gap is preferably formed between focussing member and detector plate, and the detectors are arranged at least partly in the gap. This embodiment has the advantage that the light beam leaving the focussing elements need not pass through the detector plate, but can be directed directly onto the detector elements. The gap between focussing member on one side and detector plate on the other can be produced for example by spacer elements which are arranged between focussing member and detector plate, with the result that a gap in which the detectors can in turn be arranged forms between two spacer elements. The spacer elements can naturally be formed integrally either with the focussing member and/or with the detector plate.

In a further preferred embodiment, detector plate and focussing member are made from different materials, with the result that at typical operating temperatures, such as e.g. at a temperature of 25° C., the material from which the detector plate is made has a lower thermal expansion coefficient than the material from which the focussing element is made. Thus it is possible for example to produce the focussing element as a shaped plastic part, wherein the focussing elements can be formed in one piece as curved reflecting surfaces, as is described in DE 10 2005 010 557, the content of which is hereby incorporated into this application.

Alternatively, the detector plate can be made from a material with a clearly lower thermal expansion coefficient, such as e.g. kovar or a ceramic. By kovar is meant alloys which have a very low thermal expansion coefficient, typically of less than 10 ppm/K. As the detector plate supports the detectors, corresponding electric connections must be guided through the detector plate. In order to achieve a high degree of sealing, for example metal-glass ducts can be used. However, these can be realized only with materials having a very low thermal expansion coefficient. The use of different materials therefore allows the focussing member to be made cheaply and easily as a shaped plastic part and simultaneously vacuum-tight electronic ducts through the detector plate.

However, because of the different thermal expansion coefficients of detector plate on the one hand and focussing member on the other, a misalignment of the demultiplexer can occur in extreme temperature situations.

Therefore, it is provided in a preferred embodiment that focussing member and detector plate are connected to each other via a connecting element, wherein the connecting element has two spring elements each of which has spring constants which are at least double in each of two perpendicular directions to what they are in a third spatial direction, perpendicular to the two first spatial directions, the so-named elasticity direction, wherein the two spring elements have elasticity directions which do not run parallel to each other. In principle, connecting elements such as are described and shown for example in DE 10 2005 040 731, the content of which is hereby incorporated into this application, can be used.

The effect of using the described connecting elements is that at least the angular accuracy remains relatively high during major temperature changes. Each spring element serves on the one hand to allow the movement of the first component relative to the second component to a limited extent, in particular when there is a temperature change, in one direction, the so-named elasticity direction, while a corresponding relative movement in the other directions running approximately perpendicular thereto is prevented as far as possible. In a preferred embodiment, the elasticity direction runs substantially parallel to the surfaces to be aligned relative to each other of focussing member and detector plate.

In a further preferred embodiment, the focussing member is formed as a shaped part, wherein the focussing elements are preferably formed integral with the shaped part and consist of curved reflecting surfaces. The curved reflecting surfaces can be formed for example as described in DE 100 43 985, which is hereby incorporated by reference. In principle, the shaped part can be formed as described in DE 10 2005 010 557, the content of which is hereby incorporated into this application.

In a further preferred embodiment, the focussing member has at least one fibre stop, preferably formed integrally with the focussing member, for adjusting a waveguide. This stop can be realized for example by a flat surface on which the focal point of the curved surface lies. The glass fibre needs thereby merely to be placed onto the flat surface in order to make it easier to adjust the glass fibre precisely in one direction. Embodiments are preferred in which the stop allows an adjustment at least in two directions or, particularly preferably, even in three directions.

In a further preferred embodiment, the carrier plate has two surfaces arranged parallel to each other, wherein a reflecting element is arranged on one surface and the at least one wave-modifying element is arranged on the other surface. The use of a carrier plate with two surfaces arranged parallel to each other ensures that reflecting element on the one hand and wave-modifying elements on the other are precisely arranged relative to each other. The reflecting element can be a mirror element, for example.

It is provided in a further preferred embodiment that the at least two detectors of the detector plate lie on a line which runs parallel to the parallel surfaces of the carrier plate. This makes possible a simple adjustment of the carrier plate vis-à-vis the detector plate, with the result that an optical adjustment such that the parallel surfaces and the detector line run parallel is easy to realize.

It is provided in a further preferred embodiment that the detector plate and/or the carrier plate has at least one spacer element, wherein the at least one spacer element is arranged such that a gap is formed between detector plate and carrier plate, wherein electrical connections of the detectors are preferably arranged inside the gap. Naturally, the spacer element can be secured integrally to the detector plate and/or the carrier plate. As a result of the arrangement of the electric connections in the gap, the design of the multiplexer/demultiplexer element can be more compact.

The carrier plate can have openings which are provided for the signal beam, with the result that the carrier plate does not insert material into the beam path. If curved reflecting surfaces are used as focussing elements, the whole of the demultiplexer/multiplexer manages completely without material in the beam path, apart from the unavoidable band filters. A high signal yield can thereby be achieved.

BRIEF DESCRIPTION OF THE DRAWINGS

Further advantages, features and possible applications of the present invention become clear with the help of the following description of a preferred embodiment and the associated figures. There are shown in.

DETAILED DESCRIPTION OF THE INVENTION

Figure 1:
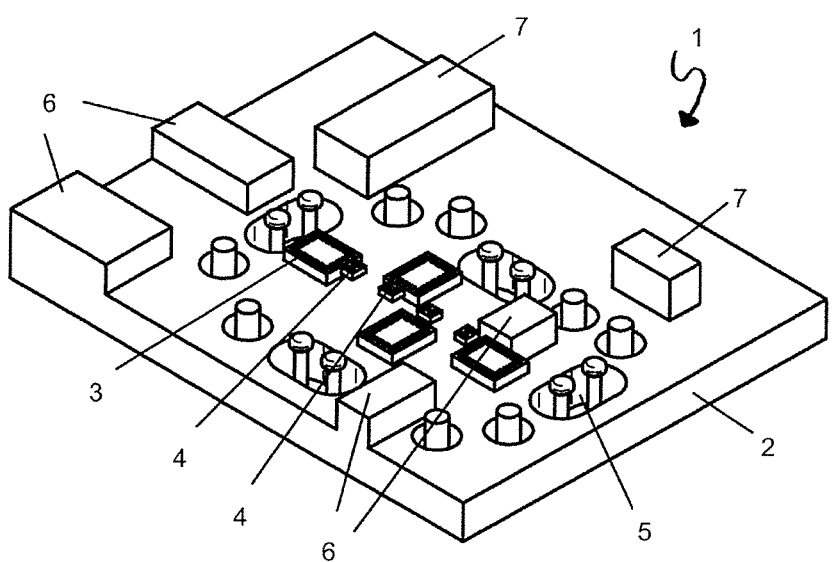
FIG. 1 a detector plate,
FIG. 2 a perspective view of a carrier plate,
FIG. 3 a further perspective view of the carrier plate of FIG. 2,
FIG. 4 a perspective view of a focussing member,
FIG. 5 a perspective view of a focussing member with glass fibre,
FIG. 6 a perspective view of a connecting element,
FIG. 7 an exploded view of the demultiplexer,
FIG. 8 a perspective view of the detector plate with fitted focussing element,
FIG. 9 a perspective view of the detector plate with fitted carrier plate,
FIG. 10 a perspective view of the detector plate with fitted carrier plate and focussing element,
FIG. 11 a further perspective view as in FIG. 10,
FIG. 12 a perspective view with radiation path shown and
FIG. 13 a perspective view similar to the view of FIG. 12.

A detector plate 1 is shown in FIG. 1. The detector plate 1 has a base plate 2 of nickel-plated kovar. Four detectors 4 with corresponding signal processing elements 3 are arranged on the base plate 2.

The base plate 2 has a row of electric ducts 5 fused into glass via which the detectors can be placed in electric contact from the rear side of the base plate 2. The connection wires are not shown for greater ease of representation.

The detector plate 1 has a row of spacer elements 6, 7 the significance of which is described later.

Figure 2:
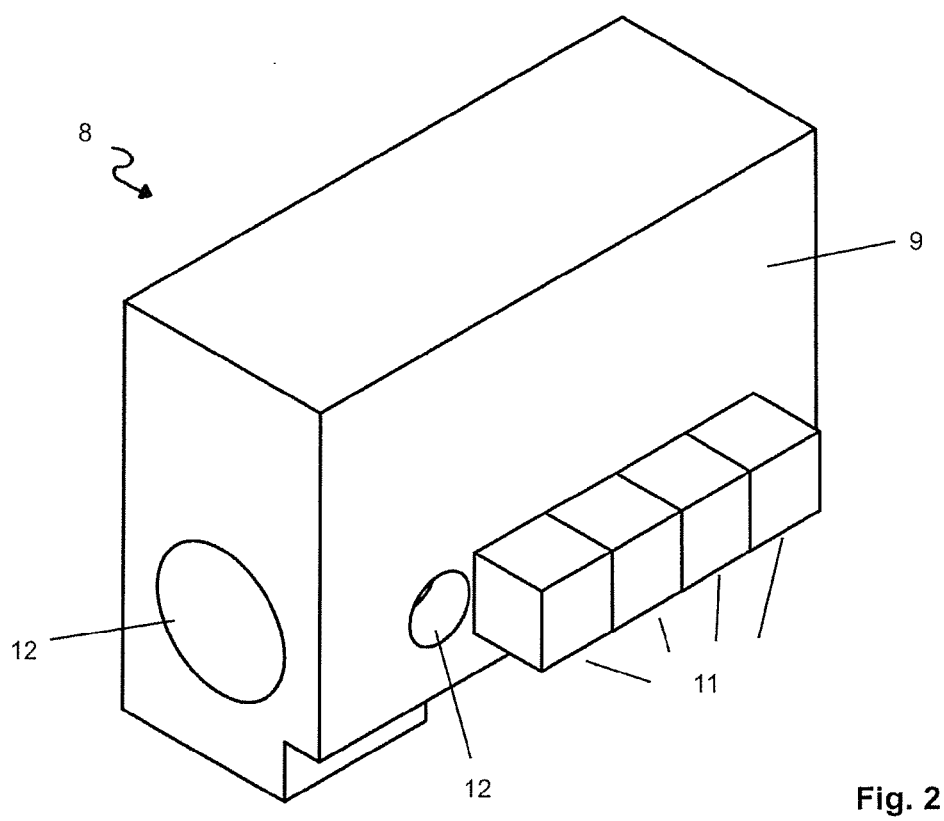
Figure 3:
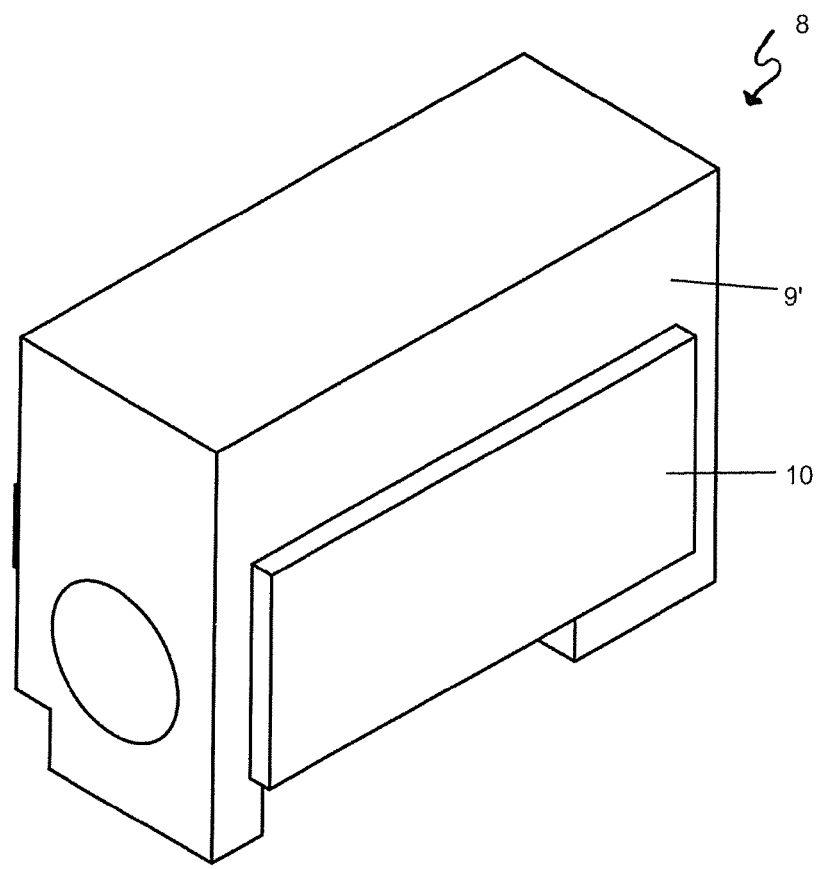

Two perspective views of a carrier plate 8 are shown in FIG. 2 and FIG. 3. The carrier plate 8 has two surfaces 9, 9' running parallel to each other. A mirror element 10 is arranged on one surface 9' while several wave-modifying elements 11 are arranged on the opposite surface 9. Band filters which each transmit a specific wavelength channel are used as wave-modifying elements, while all other wavelength channels are reflected. The carrier plate 8 is made of metal. In order to ensure a passage of the light beams from the wave-modifying elements to the reflecting element 10 and back, corresponding bores 12 are made in the carrier plate 8.

Figure 4:
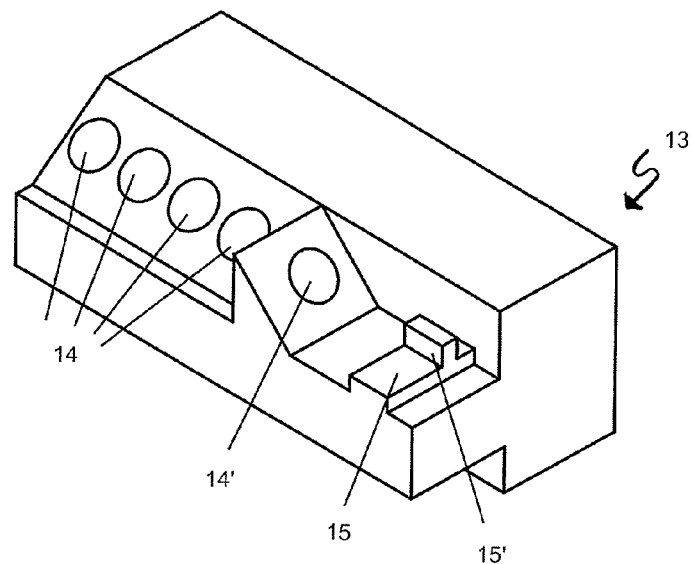
Figure 5:
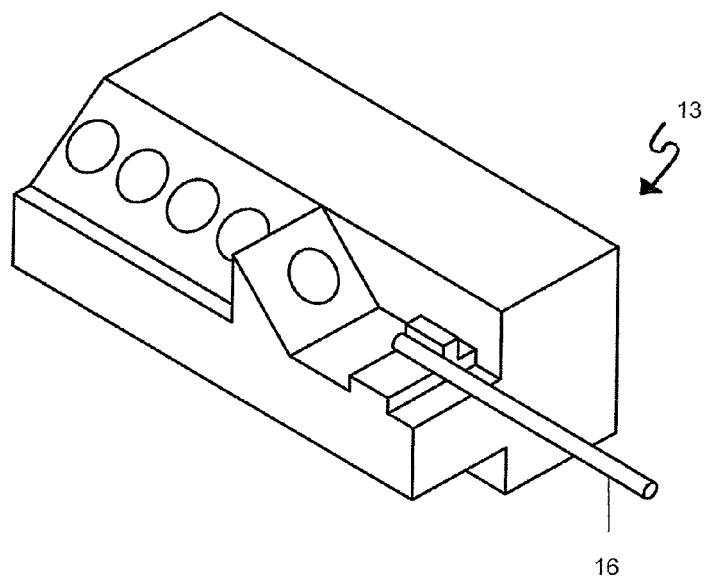

A focussing member 13 is shown in FIG. 4. The focussing member has a row of focussing elements 14, 14'. The focussing elements 14, 14' are curved reflecting surfaces which are curved such that they focus a parallel light beam in one point, the so-named focus or focal point. The focussing member 13 is formed as a shaped part, i.e. the focussing member and the focussing elements 14, 14' form one piece. Two stop surfaces 15, 15' are also provided. To adjust a glass fibre 16 (see FIG. 5), the glass fibre 16 is placed on the two fibre stops 15 and 15'.

The light beam emerging divergently from the glass fibre end lies in the focal point of the focussing element 14'. The divergent light beam is converted into a parallel light beam by the focussing element 14' and is then, as is explained in even more detail below, directed onto the reflection element 10 and reflected and then directed onto a further focussing element 14. A first wavelength-sensitive element 11, which ensures that only one wavelength channel strikes the focussing element 14, is arranged in the light path. The focussing element 14 converts the parallel light beam into a focussed beam, wherein the detectors 4 are arranged in the focus of the focussing elements 14.

Figure 6:
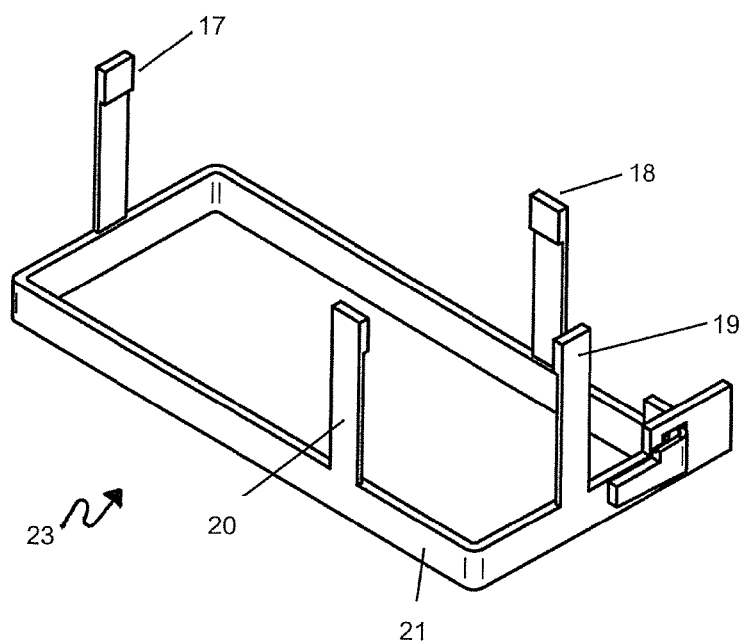

There is shown in FIG. 6 a connecting element which is provided for connecting the focussing member 13 to the detector plate 1. The connecting element is composed of a frame 21 and four spring elements 17, 18, 19, 20 extending therefrom, each of which has a contact section and a section adjoining same with a reduced thickness vis-à-vis the contact section. The frame 21 has bending points as well as a closure bending mechanism, with the result that the connecting element can be produced in one piece.

Figure 7:
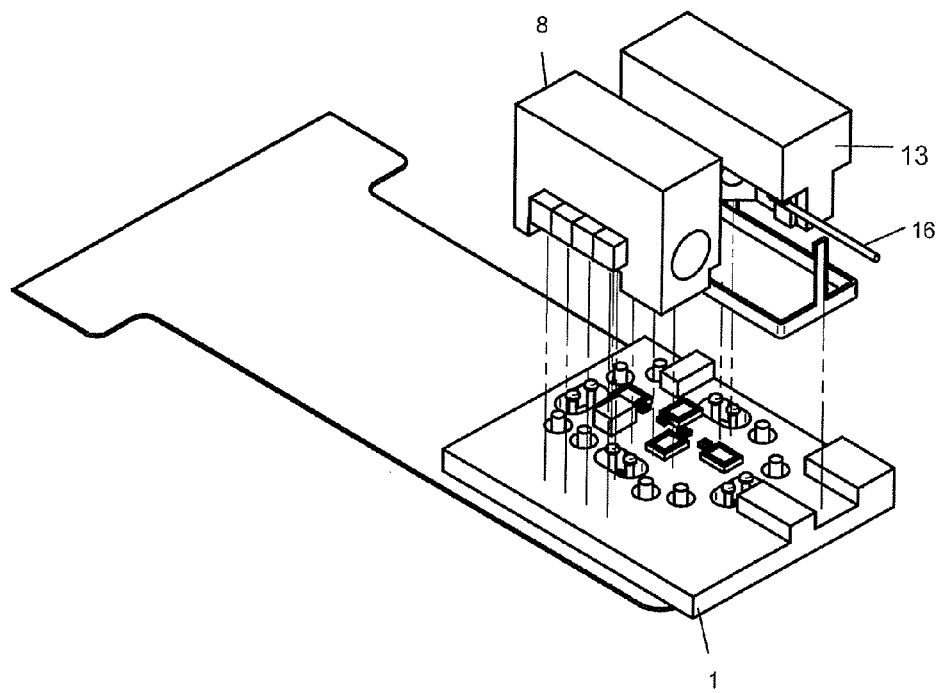

An exploded view of the demultiplexer is shown in FIG. 7. The detector plate 1 is mounted on a connection tab 22 via which the detector elements are placed in electric contact. The carrier plate 8 and likewise the focussing member 13 can be seen.

Figure 8:
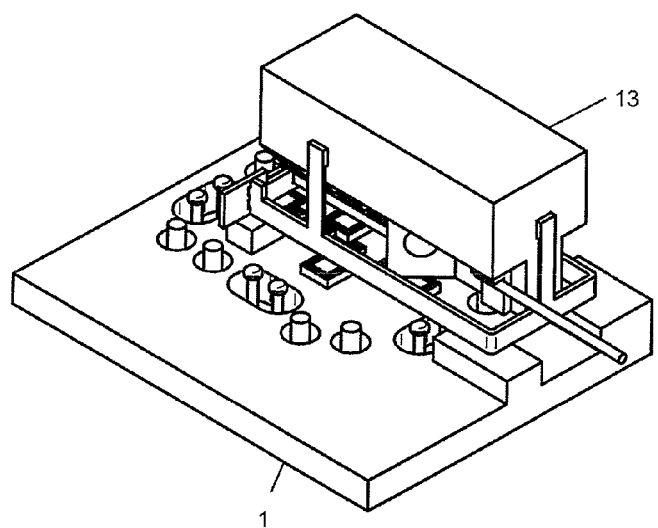

A perspective view of the detector plate 1 with fitted focussing member 13 is shown in FIG. 8. The focussing member 13 is connected to the detector plate 1 via the connecting element 23. The focussing member 13 is in contact at each of the four peripheral edge surfaces with one of the spring elements of the connecting element 23. The connecting element 23 stands with the frame 21 on the spacer surfaces 6. It is ensured by the connection surfaces 6 which are formed integral with the detector plate 1 that between the focussing elements of the focussing member 13 and the detector plate 1 a gap forms in which the detectors 4 are arranged. In other words, the detectors 4 are located between detector plate 1 and focussing member 13.

Figure 9:
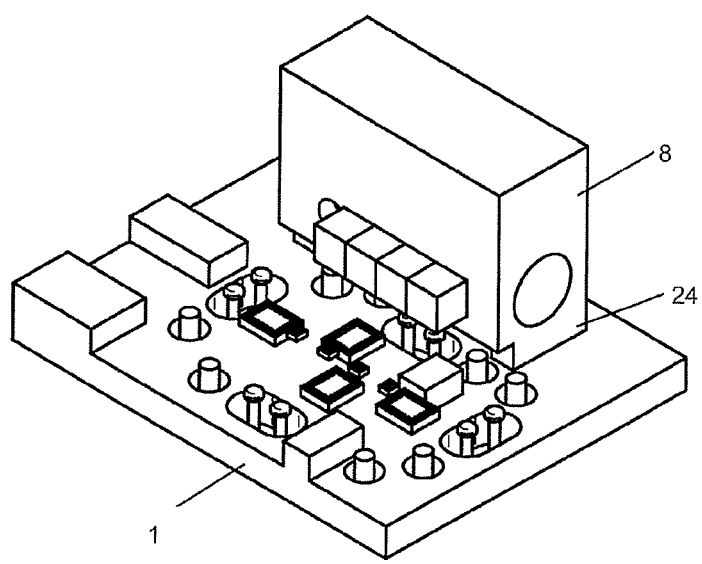

A perspective view of a detector plate 1 with fitted carrier plate 8 is shown in FIG. 9. Unlike the previous embodiments the detector plate 1 has spacer surfaces 7 which serve to support the carrier plate 8. Instead the carrier plate 8 has spacer elements 24 moulded in one piece to same with which the carrier plate 8 sits on the detector plate 1, with the result that a gap in which electric connections can be arranged forms between carrier plate 8 and detector plate 1, which allows the detector element to be designed smaller.

Figure 10:
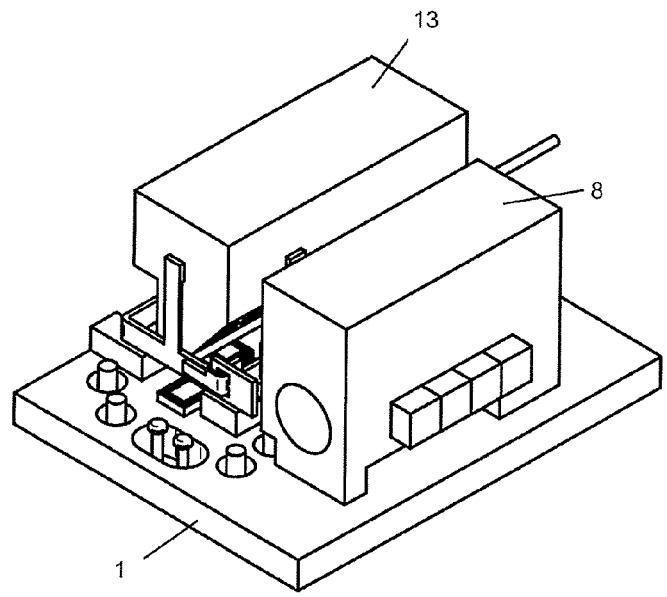
Figure 11:
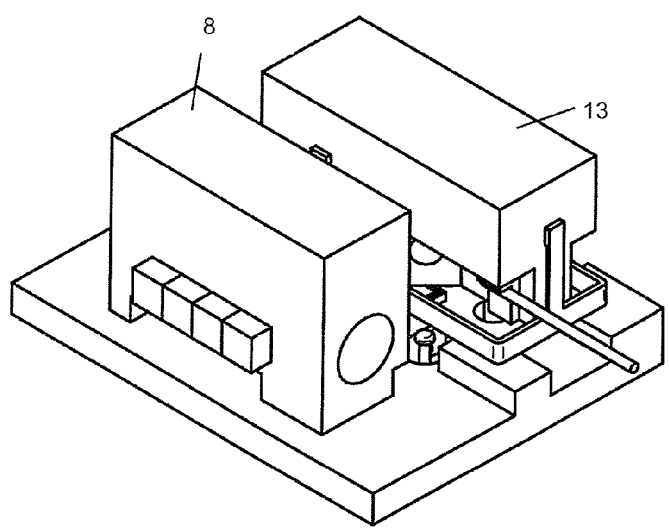

Finally, in FIG. 10 a perspective view is shown in which both the carrier plate 8 and the focussing member 13 are arranged on the detector plate 1. A similar view from a different perspective can be seen in FIG. 11.

In a particularly preferred embodiment, a cap (not shown) is placed over the carrier plate 8 and the focussing member 13 such that the cap forms with the detector plate 1 a closed space which is evacuated or filled with a protective gas in a preferred embodiment. The closed space is therefore advantageously sealed to be vacuum-tight.

Figure 12:
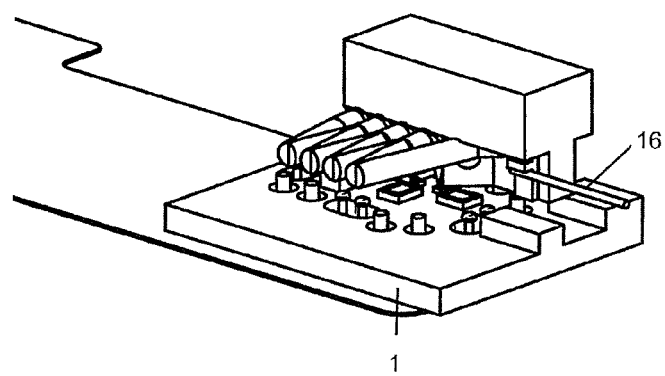
Figure 13:
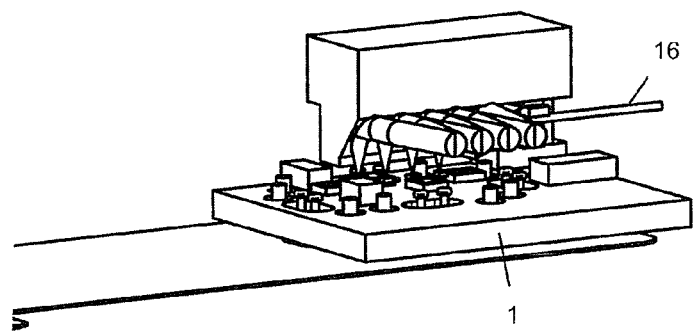

Perspective views of a detector plate 1 with fitted focussing member 13 are shown in FIGS. 12 and 13, wherein the beam path has been shown here schematically. Parallel beams are shown as cylinders, while divergent beams are shown as cones.

It can be seen that light emerges divergently from the glass fibre 10, strikes a first curved reflecting surface which converts the divergent light into a parallel light beam shown as cylinder. This light beam then passes through the bore made in the carrier plate (the carrier plate is not shown in this drawing) and strikes the mirror element 10 which directs the light beam onto the first wavelength-modifying element. There, only one wavelength channel is allowed through, while all other wavelength channels are reflected back by the mirror element 10. The transmitted wavelength channel then strikes a focussing element and is focussed onto the detector surface. The element reflected from the wavelength-modifying element is reflected anew at the mirror element 10 and then strikes the second wavelength-modifying element. Here also only one wavelength channel will be able to pass, while all other wavelength channels are reflected. As a result, in each case one wavelength channel is projected onto one detector 4.

The described demultiplexer is extremely compact and can be adjusted very easily. In the first step, the carrier plate 8 with fitted mirror element 10 and wave-modifying elements 11 is placed on the detector plate 1 and aligned such that the parallel surfaces run parallel to the detector line. The carrier plate 8 is then fixed, e.g. glued, to the detector plate 1.

In the next step, the fibre 10 is fixed to the focussing member 13 with the help of the fibre stops and the focussing member 13 connected to the connecting element such that in each case one wavelength channel is projected onto one detector surface.

LIST OF REFERENCE NUMBERS 1 detector plate
2 base plate
3 signal processing element
4 detector
5 electric duct
6, 7 spacer element
8 carrier plate
9, 9' surfaces running parallel to each other
10 mirror element
11 wave-modifying element
12 bore
13 focussing member
14, 14' focussing elements
15, 15' stop surfaces
16 glass fibre
17, 18, 19, 20 spring elements
21 frame
22 connection tab
23 connecting element
24 spacer element

The invention claimed is:

1. Multiplexer/demultiplexer with a connection for inputting and/or outputting an optical signal having signal components of different wavelengths, a carrier plate (8) with at least one wavelength-sensitive element (11), a focussing member (13) with at least two focussing elements (14, 14') and a detector or signal-generator plate (1), on which at least two detectors (4) or signal generators are arranged, characterized in that both the carrier plate (8) and the focussing member (13) are connected to the detector or signal-generator plate (1) and the focussing member (13) is formed as a shaped part, wherein the focussing elements (14, 14') are formed integrally with the shaped part and have curved reflecting surfaces, further characterized in that the detector or signal-generator plate (1) and/or the carrier plate (8) has at least one spacer element (6, 7), wherein the at least one spacer element (6, 7) is arranged such that a gap is formed between detector or signal-generator plate (1) and carrier plate (8), and also characterized in that electric connections of the detectors are arranged inside the gap.

2. Multiplexer/demultiplexer according to claim 1, characterized in that the detectors (4) of the detector plate (1) are arranged on the side of the detector plate (1) facing the focussing member (13), wherein a gap is formed between focussing member and detector plate and the detectors are arranged at least partly in the gap, wherein said integral form being said focussing member and said focus elements are formed in one piece.

3. Multiplexer/demultiplexer according to one of claim 1 and 2, characterized in that detector plate (1) and focussing member (13) are made from different materials, with the result that, at a temperature of 25.degree. C., the material from which the detector plate is made has a lower thermal expansion coefficient than the material from which the focussing element is made.

4. Multiplexer/demultiplexer according to one of claims 1 and 2, characterized in that the focussing member (13) and the detector plate (1) are connected to each other via a connecting element (23), wherein the connecting element (23) has two spring elements (17, 18, 19, 20) each of which has spring constants which are at least double in each of two perpendicular directions to what they are in a third spatial direction being perpendicular to the two first spatial directions, being the elasticity direction, wherein the two spring elements have elasticity directions which are not parallel to each other.

5. Multiplexer/demultiplexer according to one of claims 1 and 2, characterized in that the focussing member (13) has at least one fibre stop, formed integrally with the focussing member (13), for adjusting a waveguide.

6. Multiplexer/demultiplexer according to claim 5, characterized in that the fibre stop is formed such that it allows the passive adjustment of the waveguide in relation to the focussing member (13) in two, or in three, directions that are substantially perpendicular to each other.

7. Multiplexer/demultiplexer according to one of claim 1 and 2, characterized in that the carrier plate (8) has two surfaces (9, 9') arranged parallel to each other, wherein a reflecting element (10) is arranged on one surface and the at least one wave-modifying element (11) is arranged on the other surface.

8. Multiplexer/demultiplexer according to claim 7, characterized in that the at least two detectors (4) of the detector or signal-generator plate (1) lie on a line which runs parallel to the parallel surfaces of the carrier plate (8).

9. Multiplexer/demultiplexer according to claim 7, characterized in that the at least two detectors (4) of the detector or signal-generator plate (1) lie on a line which, with the parallel surfaces of the carrier plate (8), enclose an angle which is selected such that the signal input via the connection is aligned by the at least one reflecting element (10) perpendicular to the connecting line of the detectors.

* * * * *